US011215985B2

(12) United States Patent
Laurent et al.

(10) Patent No.: US 11,215,985 B2
(45) Date of Patent: Jan. 4, 2022

(54) PATHFINDING ASSISTANCE SYSTEM FOR TELEOPERATION

(71) Applicants: Nissan North America, Inc., Franklin, TN (US); Renault S.A.S., Boulogne-Billancourt (FR)

(72) Inventors: Aude Laurent, Redwood City, CA (US); Kevin Poulet, Menlo Park, CA (US); Omar Bentahar, Sunnyvale, CA (US); Siddharth Thakur, Fremont, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 231 days.

(21) Appl. No.: 16/354,920

(22) Filed: Mar. 15, 2019

(65) Prior Publication Data

US 2020/0293038 A1    Sep. 17, 2020

(51) Int. Cl.
*G05D 1/00* (2006.01)
*G05D 1/02* (2020.01)

(52) U.S. Cl.
CPC ......... *G05D 1/0038* (2013.01); *G05D 1/0088* (2013.01); *G05D 1/0278* (2013.01); *G05D 2201/0213* (2013.01)

(58) Field of Classification Search
CPC .. G05D 1/0038; G05D 1/0088; G05D 1/0278; G05D 2201/0213
See application file for complete search history.

(56) References Cited

U.S. PATENT DOCUMENTS 9,958,272 B2 * 5/2018 Morris, IV ......... G01C 21/3415
2014/0358409 A1 * 12/2014 Khoe ..................... G01C 21/26
701/117

(Continued)

FOREIGN PATENT DOCUMENTS

CN    104932524 A  *  9/2015

OTHER PUBLICATIONS

Voigt, Satellite Image Analysis for Disaster and Crisis-Management Support, IEEE vol. 45, No. 6, Jun. 2007 (Year: 2007).*

(Continued)

*Primary Examiner* — Tyler J Lee
*Assistant Examiner* — Yufeng Zhang
(74) *Attorney, Agent, or Firm* — Young Basile Hanlon & MacFarlane, P.C.

(57) ABSTRACT

An apparatus for remote support of autonomous operation of a vehicle is described. The apparatus includes a processor that performs a method including receiving a query to define a path for the vehicle while the vehicle is traveling along a route from an origin to a destination in a vehicle transportation network, the query comprising multiple points including at least a start point and an end point of the path, obtaining a satellite image of a portion of a geographical area that encompasses the multiple points, determining, using the satellite image, static obstacles within the portion of the geographical area, the static obstacles defining navigable areas within the vehicle transportation network, generating the path through each of the multiple points such that the path is located within at least one navigable area of the navigable areas, and transmitting the path for use by the vehicle.

20 Claims, 10 Drawing Sheets

(56) References Cited

U.S. PATENT DOCUMENTS

| | | | | |
|---|---|---|---|---|
| 2015/0134177 A1* | 5/2015 | Lee | ......................... | G01C 21/34 |
| | | | | 701/23 |
| 2015/0284010 A1* | 10/2015 | Beardsley | ................. | G08G 1/22 |
| | | | | 701/41 |
| 2017/0307394 A1* | 10/2017 | Caldas | ................ | G01C 21/3602 |
| 2017/0371346 A1* | 12/2017 | Mei | ........................ | G01S 17/931 |
| 2018/0051991 A1* | 2/2018 | Hong | .................... | G01C 21/343 |
| 2018/0209801 A1* | 7/2018 | Stentz | ................ | G01C 21/3415 |
| 2019/0179305 A1* | 6/2019 | Magzimof | ............ | G05D 1/0038 |
| 2019/0243380 A1* | 8/2019 | Lavoie | ................. | G05D 1/0016 |
| 2019/0250638 A1* | 8/2019 | Mueller | ................. | G06Q 50/30 |
| 2020/0175432 A1* | 6/2020 | Iwasaki | .................. | G06Q 50/30 |
| 2020/0216061 A1* | 7/2020 | Zidek | ...................... | G08G 1/165 |
| 2020/0249037 A1* | 8/2020 | Gan | ......................... | G05D 1/02 |

OTHER PUBLICATIONS

Machine translation of CN-104932524-A.*

\* cited by examiner

PATHFINDING ASSISTANCE SYSTEM FOR TELEOPERATION

TECHNICAL FIELD

This application relates to autonomous vehicle monitoring and assistance, including methods, apparatuses, systems, and non-transitory computer readable media for the remote monitoring and tele-operation of autonomous vehicles.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, autonomous vehicles often encounter situations where they are not able to determine a course of action. This can limit the utility of autonomous vehicles.

SUMMARY

Disclosed herein are aspects, features, elements, implementations, and implementations for remote support of autonomous operation of a vehicle. The implementations support remote operation that determines a path for a vehicle.

An aspect of the disclosed implementations includes an apparatus for remote support of autonomous operation of vehicles. The apparatus includes a processor. The processor can perform a method including receiving a query to define a path for the vehicle while the vehicle is traveling along a route from an origin to a destination in a vehicle transportation network, the query comprising multiple points including at least a start point and an end point of the path, obtaining a satellite image of a portion of the vehicle transportation network that encompasses the multiple points, determining, using the satellite image, static obstacles within the portion of the vehicle transportation network, the multiple points located within navigable areas defined by the static obstacles, generating the path through each of the multiple points, and transmitting the path for use by the vehicle.

An aspect of the disclosed implementations includes an apparatus for remote support of autonomous operation of vehicles. The apparatus includes a processor and an assistance request system. The assistance request system can receive an assistance request signal from the vehicle, the assistance request signal identifying a need for assistance by the vehicle while traveling the route. The assistance request system may transmit to the processor, responsive to receiving the assistance request signal, a query to define a path for the vehicle while the vehicle is traveling along a route from an origin to a destination in a vehicle transportation network. The processor performs a method including receiving the query, the query comprising multiple points including at least a start point and an end point of the path, obtaining a satellite image of a portion of the vehicle transportation network that encompasses the multiple points, determining, using the satellite image, static obstacles within the portion of the vehicle transportation network, the multiple points located within navigable areas defined by the static obstacles, generating the path through each of the multiple points, and transmitting the path to the assistance request system, wherein the assistance request system transmits the path to the vehicle.

An aspect of the disclosed implementations includes a method for providing remote support of autonomous operation of a vehicle. The method can include receiving a query to define a path for the vehicle while the vehicle is traveling along a route from an origin to a destination in a vehicle transportation network, the query comprising multiple points including at least a start point and an end point of the path, obtaining a satellite image of a portion of the vehicle transportation network that encompasses the multiple points, determining, using the satellite image, static obstacles within the portion of the vehicle transportation network, the multiple points located within navigable areas defined by the static obstacles, generating the path through each of the multiple points, and transmitting the path for use by the vehicle.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity. Further, like reference numbers refer to like elements throughout the drawings unless otherwise noted.

DETAILED DESCRIPTION

An autonomous vehicle, whether or not it has a passenger that can intervene in its operation, may need assistance while traveling along a route from an origin to a destination in a vehicle transportation network. For example, the vehicle may need a path that traverses an unmapped portion of the vehicle transportation network, or one that does not conform to standard traffic rules to which the vehicle operates (e.g., no lines on the road, obstacles in the route, a barrier to reaching the coordinates at the destination, etc.)

The utility of autonomous vehicles may be increased by using a remote operation to define a path while the vehicle is traveling along a route. To describe some implementations of the teachings herein in greater detail, reference is first made to the environment in which this disclosure may be implemented.

Figure 1:
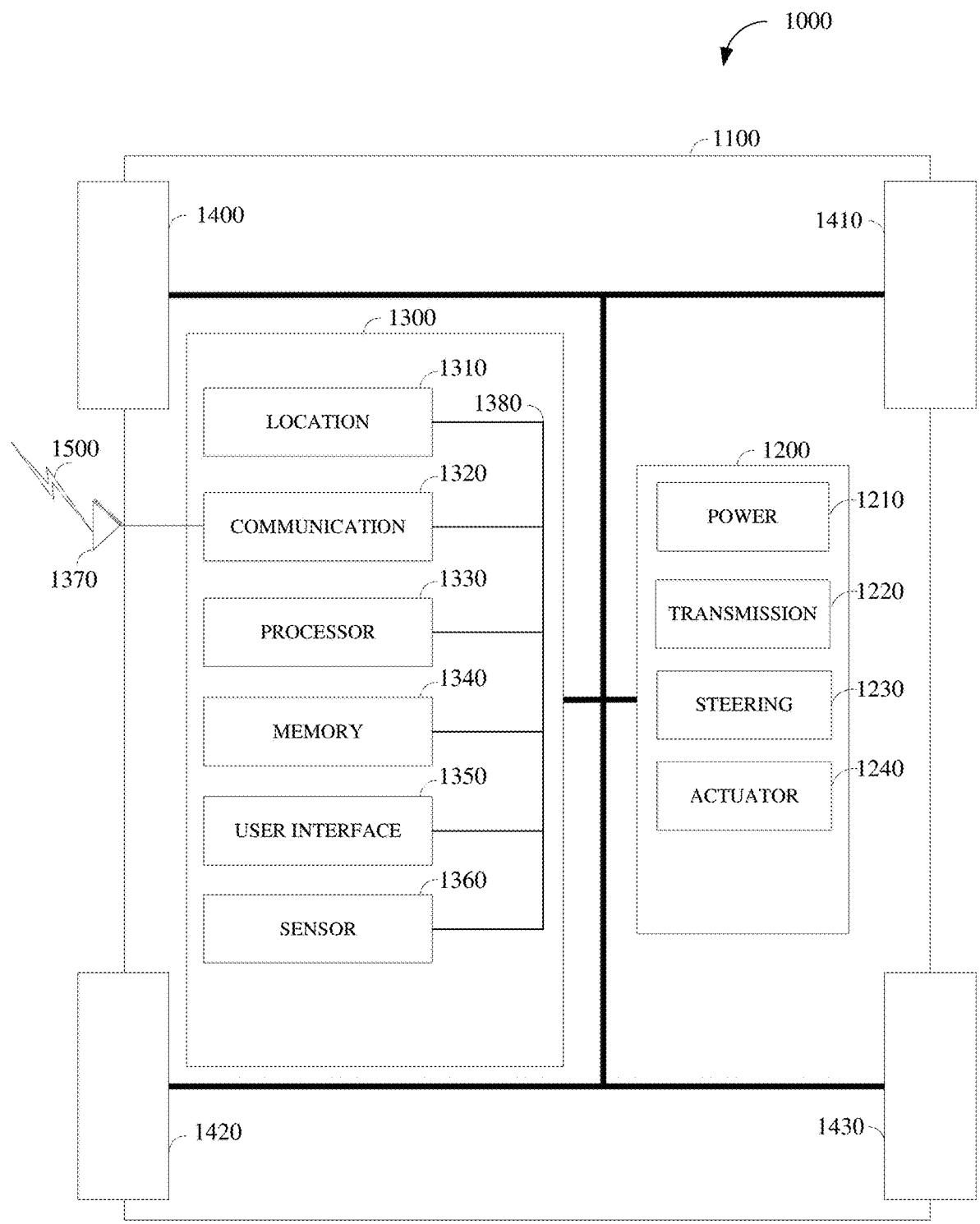
FIG. 1 is a diagram of an example of a portion of a vehicle in which the aspects, features, and elements disclosed herein may be implemented.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/ 1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories (ROM), one or more random access memories (RAM), one or more random access memories (RAM), one or more registers, low power double data rate (LPDDR) memories, one or more cache memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensor 1360 included, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 includes sensors that are operable to obtain information regarding the physical environment surrounding the vehicle 1000. For example, one or more sensors detect road geometry and obstacles, such as fixed obstacles, vehicles, cyclists, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. The sensor 1360 and the location unit 1310 may be combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. The optimized trajectory can be control inputs such as a set of steering angles, with each steering angle corresponding to a point in time or a position. The optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
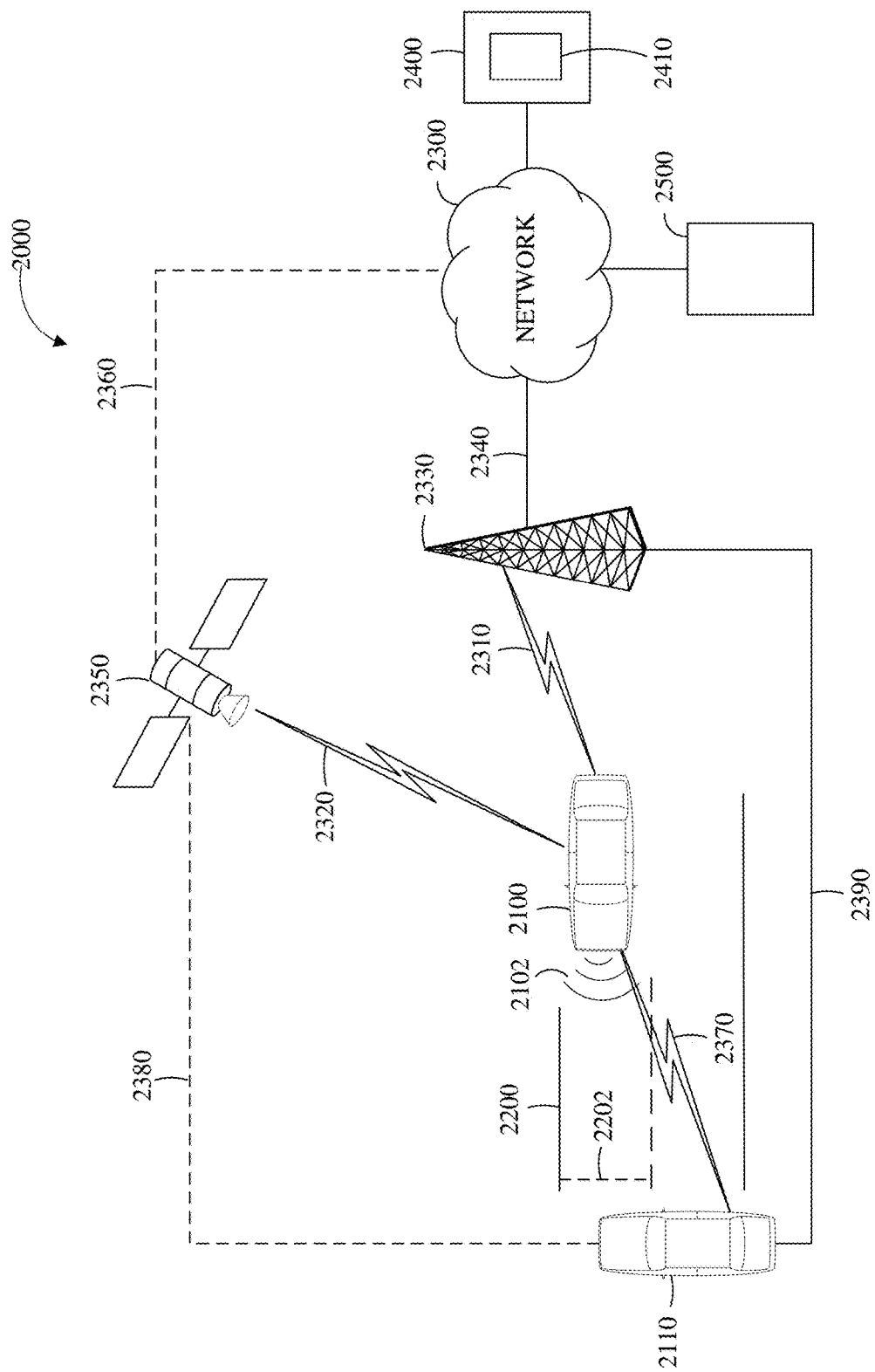
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices that may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. A terrestrial wireless communication link 2310 may include an Ethernet link, a serial link, a Bluetooth link, an infrared (IR) link, an ultraviolet (UV) link, or any link capable of electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, the operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

The vehicle 2100 may communicate with the electronic communication network 2300 via an access point 2330. The access point 2330, which may include a computing device, is configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from vehicles such as the vehicle 2100, external objects including the external object 2110, or computing devices such as the server computing device 2500.

The vehicle 2100 can identify a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

The external object 2110 is illustrated as a second, remote vehicle in FIG. 2. An external object is not limited to another vehicle. An external object may be any infrastructure element, e.g., a fence, a sign, a building, etc., that has the ability transmit data to the operations center 2400. The data may be, for example, sensor data from the infrastructure element.

Figure 3:
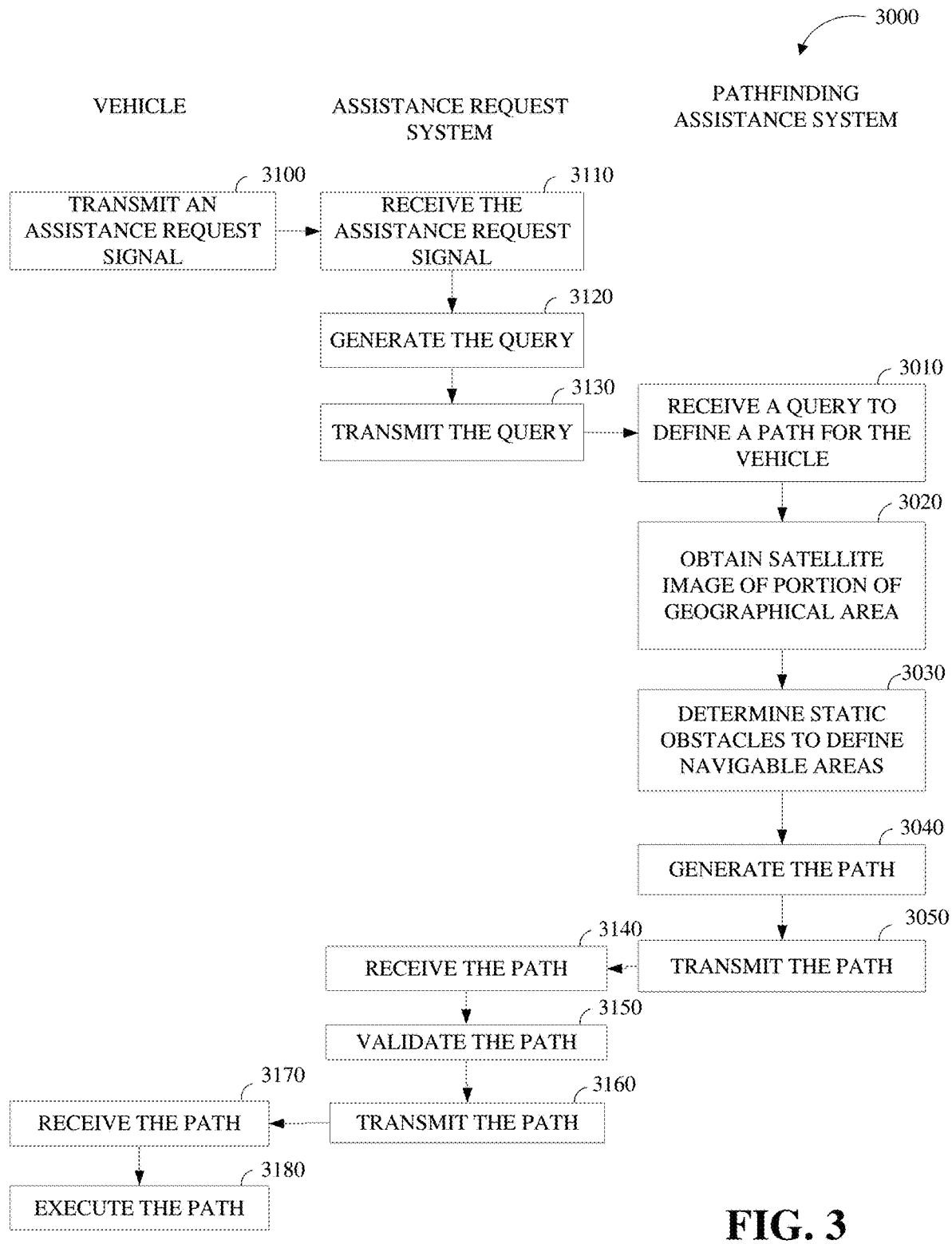
FIG. 3 is a swim lane diagram that includes a method for remote support of autonomous operation of a vehicle in accordance with the present disclosure.

FIG. 3 is a swim lane diagram that includes a method 3000 for remote support of autonomous operation of a vehicle in accordance with the present disclosure. The method 3000 may be implemented in a processor of a pathfinding assistance system that is located at the operations center 2400 or elsewhere. The method 3000 may be utilized in conjunction with a remote support system, such as a fleet manager or a vehicle manager implemented at the operations center 2400 or elsewhere. The remote support system may also be referred to as an assistance request system herein. Some aspects of the method 3000 may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the method 3000 can be implemented in a system combining some or all of the features described in this disclosure. The swim lane diagram of FIG. 3 illustrates one example of the data flow among a vehicle, an assistance request system, and a pathfinding assistance system.

At operation 3010, the processor of the pathfinding assistance system receives a query to define a path for a vehicle while the vehicle is traveling along a route from an origin to a destination in a vehicle transportation network. As mentioned above, the vehicle can include any of an autonomous vehicle or a vehicle that is driven by a human driver or a semi-autonomous vehicle. The destination may be a street address, a building name, or some other identifier of a location within a geographical area. The destination may be identified by, for example, GPS coordinates or map coordinates (e.g., a latitude and a longitude). This may be further illustrated with reference to FIG. 4.

Figure 4:
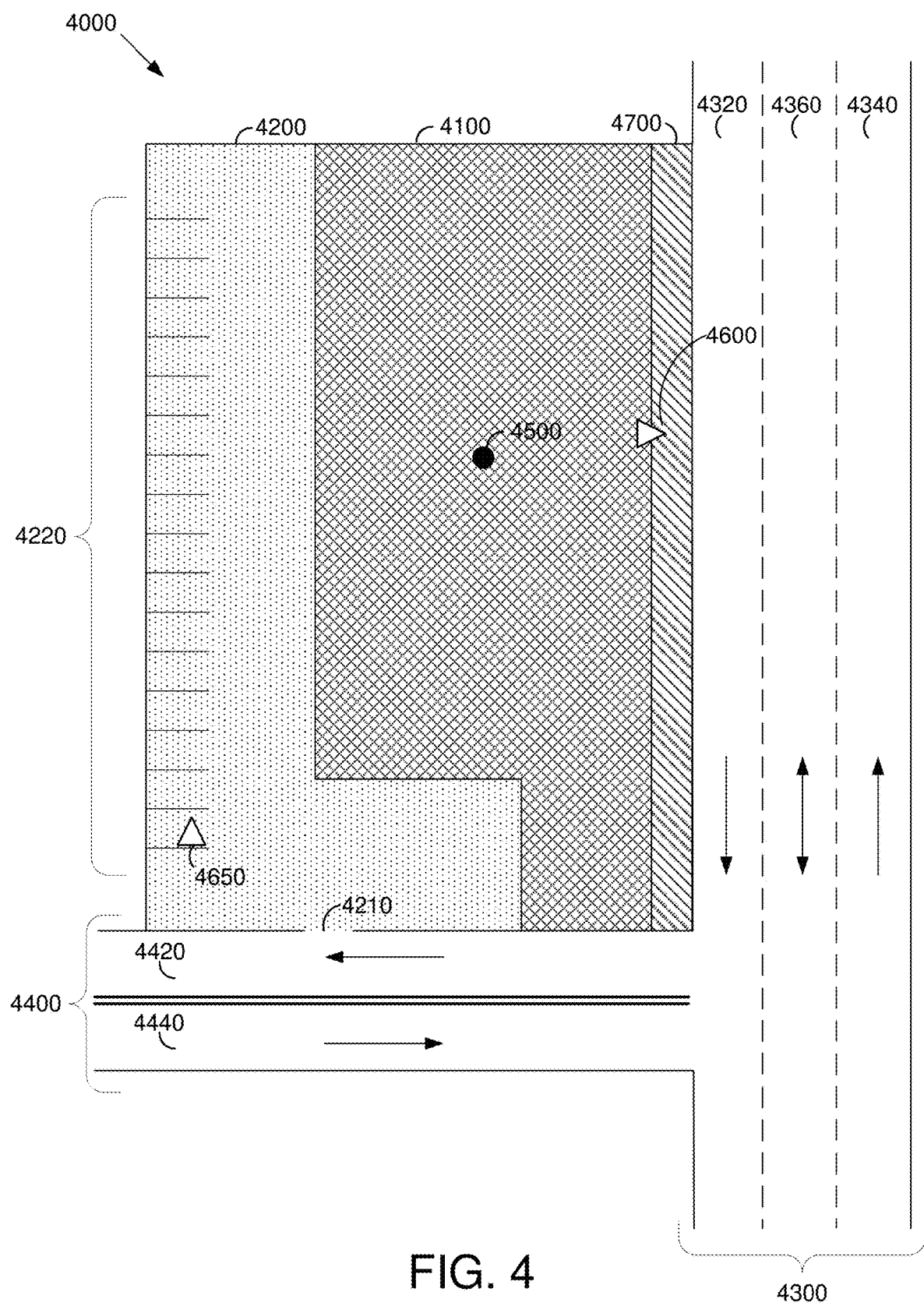
FIG. 4 is a map display including a representation of a portion of a vehicle transportation network.

FIG. 4 is a diagram of a portion of a vehicle transportation network 4000 in accordance with this disclosure. A vehicle transportation network 4000 as shown includes one or more unnavigable areas, such as a building 4100, one or more partially navigable areas, such as parking area 4200, one or more navigable areas, such as roads 4300/4400, or a combination thereof. An unnavigable area may be or encompass one or more static obstacles. Partially navigable and navigable areas may be collectively referred to as navigable areas herein.

The vehicle transportation network may include one or more interchanges between one or more navigable areas 4200/4300/4400. For example, the portion of the vehicle transportation network shown in FIG. 4 includes an entrance or interchange 4210 between the parking area 4200 and road 4400. In some embodiments, the parking area 4200 may include parking slots 4220.

A portion of the vehicle transportation network, such as a road 4300/4400 may include one or more lanes 4320/4340/4360/4420/4440, and may be associated with one or more directions of travel, which are indicated by arrows in FIG. 4.

In some embodiments, a vehicle transportation network, or a portion thereof, such as the portion of the vehicle transportation network shown in FIG. 4, may be represented as vehicle transportation network information. For example, vehicle transportation network information may be expressed as a hierarchy of elements, such as markup language elements, that may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information, or any combination thereof.

A portion, or a combination of portions, of the vehicle transportation network may be identified as a point of interest or a destination. For example, the vehicle transportation network information may identify the building 4100 as a point of interest, an autonomous vehicle may identify the point of interest as a destination, and the autonomous vehicle may travel from an origin to the destination by traversing the vehicle transportation network. The origin, like the destination, may be identified by coordinates. Each of these locations may be a discrete uniquely identifiable geolocation, such as the geographic location 4500 for the building 4100. For example, the vehicle transportation network may include a defined location, such as a street address, a postal address, a vehicle transportation network address, a longitude and latitude, or a GPS address, for each of the origin and the destination.

The origin or destination may be associated with a location such as the entrance 4600 shown in FIG. 4. In some embodiments, the vehicle transportation network information may include defined or predicted location information, such as information identifying a geolocation associated with a destination. For example, the destination may be a point at a street parking location adjacent to the destination, etc.

The vehicle transportation network may be associated with, or may include, a pedestrian transportation network. For example, FIG. 4 includes a portion 4700 of a pedestrian transportation network, which may be a pedestrian walkway. A pedestrian transportation network, or a portion thereof, such as the portion 4700 of the pedestrian transportation network shown in FIG. 4, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 4, a pedestrian navigable area, such as a pedestrian crosswalk, may correspond with a navigable area, or a partially navigable area, of a vehicle transportation network.

In some embodiments, a parking area, such as the parking area 4200, is associated with a destination, such as the building 4100. For example, the vehicle transportation network information may include defined parking area information indicating that one or more parking areas are associated with a destination. In some embodiments, the vehicle transportation network information may omit information identifying the parking area 4200 or information associating the parking area 4200 with a destination. The parking area 4200 may be an unmapped portion of the geographical area represented by the map. An unmapped portion within the geographical area may be considered one without a path for a vehicle defined and/or one that has little or no internal data such that it is defined solely by or almost solely by its outer dimensions.

Referring again to FIG. 3, the query received at operation 3010 may be received from an assistance request system. The vehicle may transmit an assistance request signal to the assistance request system at operation 3100, while the vehicle is traveling along the route from the origin to the destination in the vehicle transportation network. The vehicle may transmit the assistance request signal via one or more wireless communication links, such as the wireless communication links 2310, 2320, or 2370.

The assistance request signal transmitted at 3100 identifies a need for assistance by the vehicle while traveling the route. The assistance request signal may comprise an automated signal from the vehicle responsive to the vehicle stopping for a time above a threshold time along the route. The assistance request signal may be generated responsive to a barrier along the route. These situations that generate an assistance request signal may be determined from sensor data of the vehicle and/or from sensor data from infrastructure in a portion of the vehicle transportation network in which the vehicle is located. The portion may be a defined size about the location of the vehicle at the time of transmitting the assistance request signal, such as the sensors 1360, 2102. An assistance request signal may also be generated or initiated by a passenger of a vehicle. For example, the passenger may have a request button or selector at the user interface 1350. From activation, the assistance request signal may be transmitted through the electronic communication unit 1320. The assistance request signal may be generated by an exception, such as a missed arrival at a location along the route. The assistance request signal may be generated when the vehicle reaches the end of a mapped portion of the vehicle transportation network, and assistance through the unmapped portion of the vehicle transportation network is desired.

Referring again to FIG. 4, for example, an assistance request signal may be generated while the vehicle is traveling along the route to a destination such as the location 4500, so as to define a path for the vehicle from a start point, such as the entrance 4600, through the interchange 4210, to an end point, such as the location 4650, which is one of the parking slots 4220. Instead of the location 4650 being an end point of the path, the location 4650 may be a stop point along the path to a different end point, as discussed in more detail below.

At operation 3110, the assistance request system received the assistance request signal from the vehicle. The assistance request system transmits, responsive to receiving the assistance request signal, the query for receipt by the pathfinding assistance system. First, the assistance request system generates the query at operation 3120 and transmits the query at operation 3130.

The query comprises multiple points including at least a start point and an end point of the path. The particular technique used to generate the multiple points is not critical. In one example, the assistance request unit generates a map display that includes a representation of a geographical area and the vehicle within the geographical area as described with regard to the example of FIG. 4. Further, sensor data from the vehicle may be received from one or more sensing devices of the vehicle as described with regards to FIGS. 1 and 2. For example, sensor data may be received from the sensor 1360 of FIG. 1 or the sensor 2102 of FIG. 2. The sensor data may include image data from an image capture device of the vehicle, object detection information from the vehicle, or both. The sensor data may include any other information available from a sensor device of the vehicle. The sensor data may include sensor data from infrastructure sensor devices at stationary objects within the vehicle transportation network.

The map display and the sensor data may be combined in a remote support interface. For example, the remote support interface may generate a display such as that shown in FIG. 4. The remote support interface may also include street view data. Using a selector, such as a mouse or other input device, an operator may generate the query at operation 3120 by selecting the multiple points on the remote support interface. In addition to the start point and the end point, the multiple points may comprise at least one stop point for the path between the start point and the end point. A stop point is a location through which the path is to pass. Each of the multiple points may be identified by a latitude and a longitude in GPS or in another coordinate system of the map display.

After the assistance request system generates the query at operation 3120, the assistance request system transmits the query at operation 3130. The assistance request system may transmit the query by transmitting the coordinates of the multiple points. The assistance request system may transmit the query through a wired or wireless connection with the pathfinding assistance system. The processor of the pathfinding assistance system receives the query at operation 3010 as described above.

Figure 5A:
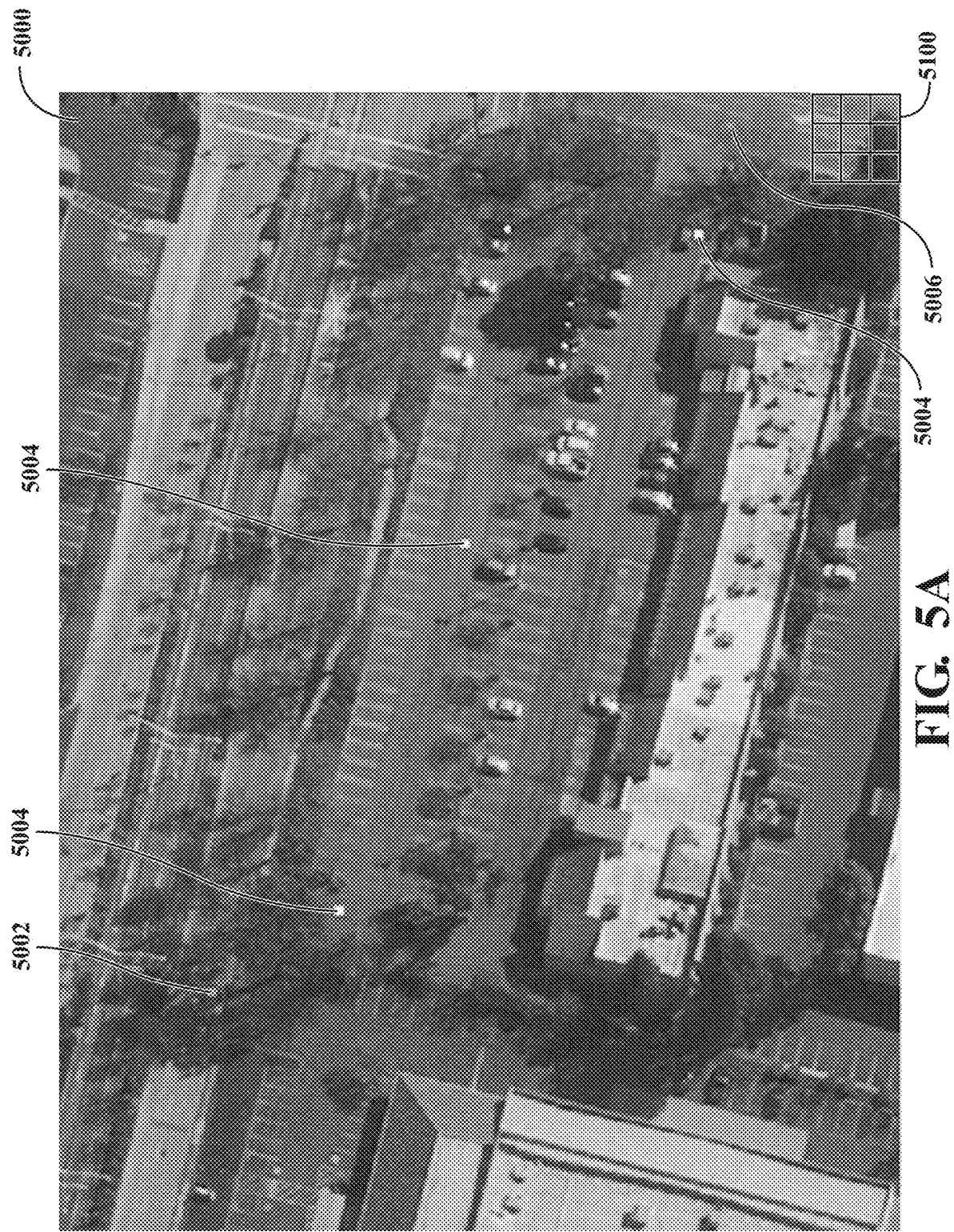
FIGS. 5A-5F are screenshots forming a sequence of an example of path generation of the pathfinding assistance system.

Further details of the use of the query to define a path for the vehicle in the method 3000 may be explained with reference to FIGS. 5A to 5F. FIGS. 5A to 5 F are screenshots forming a sequence of an example of path generation of the pathfinding assistance system.

At operation 3020, the processor of the pathfinding assistance system obtains a satellite image 5000 of a portion of a geographical area that encompasses the multiple points 5002, 5004, 5006, as shown in FIG. 5A. The satellite image 5000 may be a georeferenced high resolution satellite image. The satellite image 5000 may be one image among multiple available images that are obtained ahead of time and stored for access in a memory. The satellite image 50000 may be updated within the memory, such as when the encompassed geographic area is changed. The satellite image 5000 may be periodically updated. The multiple points 5002, 5004, 5006 include a start point 5002, one or more (in this example three) stop points 5004, and an end point 5006. The multiple points 5002, 5004, 5006 are received as part of the query from the assistance request system.

Starting at operation 3030, the processor defines one or more navigable areas of the vehicle transportation system. Defining navigable areas may be explained with further reference to FIG. 5B. First the processor determines, using the satellite image 5000, static obstacles within the portion of the geographical area represented by the satellite image 5000. Static obstacles may also be referred to a permanent obstacles. They include spaces where a vehicle cannot travel. For example, static obstacles may include, curbs, trees, buildings, parking spots, etc. Static obstacles may be identified using any image recognition process. In one example, the static obstacles are identified using a neural network-based algorithm that is trained using a dataset of images that include static obstacles likely to be seen in satellite images.

To perform the image recognition, a grid 5100 may be defined that overlays the satellite image 5000. The grid 5100 may overlay some or all of the satellite image 5000. In FIG. 5A, only a portion of the grid 5100 is shown in the lower-right corner of the satellite image 5000. The portion of the grid 5100 shown is enlarged for illustrative purposes. The dimensions of the grid blocks of the grid 5100 may vary, e.g., depending upon the scale of the satellite image 5000 and expected sizes of the navigable areas. The dimensions can be defined so that each grid block (generally a square of the grid) corresponds to one to two square meters. Other dimensions are possible. The image recognition process may be performed on a grid-block basis. Each block is defined as belonging to a static obstacle or other than a static obstacle based on the corresponding portion of the satellite image 5000. The blocks are then grouped so that the static obstacles are determined.

Figure 5B:
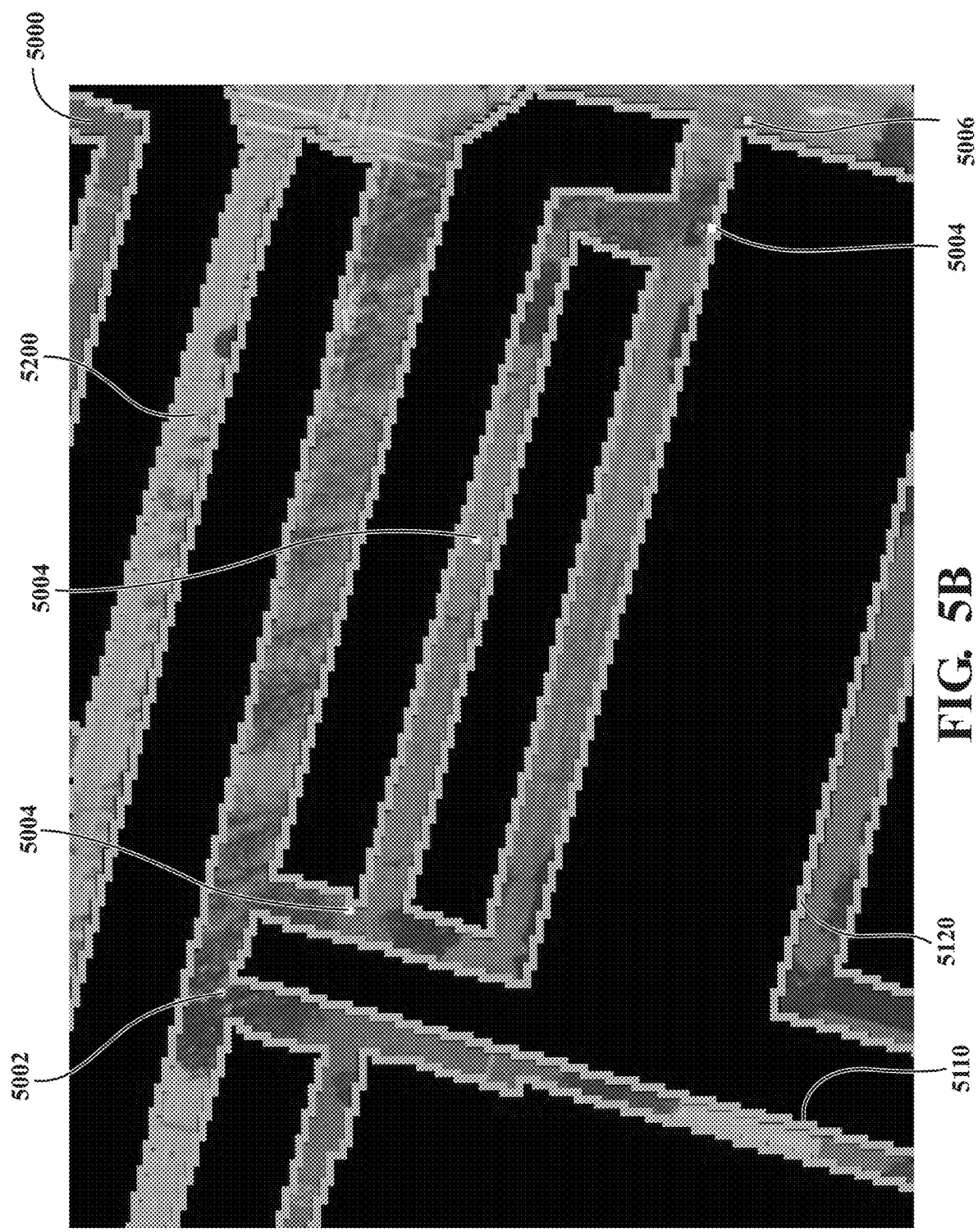

In FIG. 5B, the static obstacles are blocked out. When the static obstacles are identified using the grid 5100, boundaries of the static obstacles lie along outer edges 5110 of at least some blocks (e.g., squares) of the grid 5100. In some implementations, a navigable area 5200 is defined as any area other than one identified as a static obstacle. It is also possible to further define the navigable areas 5200 by extending the boundaries of the static obstacles a defined distance from the static obstacles. For example, and as also shown by the hatched areas in FIG. 5B, the boundaries of the static obstacles may be extended the defined distance from the outer edges 5110 of the squares of the grid that form the boundaries. This hatched area forms an extension or buffer 5120 about the static obstacles to prevent the generated path from leading to vehicle too close to a static obstacle. In this case, the navigable areas 5200 are limited to any area not identified as a static obstacle and its buffer 5120. The defined distance can vary. In one example, the defined distance, and hence the width of the buffer 5120, is 0.3 meters.

Once the satellite image 500 is modified to identify the navigable areas 5200, it may be stored in a memory of the pathfinding assistance system or elsewhere for access by the pathfinding assistance system for use with a future request.

In order to generate the path at operation 3040, the pathfinding assistance system may receive a location of the vehicle at a time of the query. The pathfinding assistance system may receive an orientation of the vehicle at a time of the query. The location, the orientation, or both may be received directly from the vehicle from one or more sensors of the vehicle, such as the sensors 1360 as described with regards to FIG. 1. Alternatively or additionally, the location, the orientation, or both may be part of the query received from the assistance request system, which in turn received the information from the vehicle. This information may be used to determine from where the vehicle will be arriving at the start point 5002. It may be used to determine at what orientation the vehicle will be when it arrives at the start point 5002.

Figure 5C:
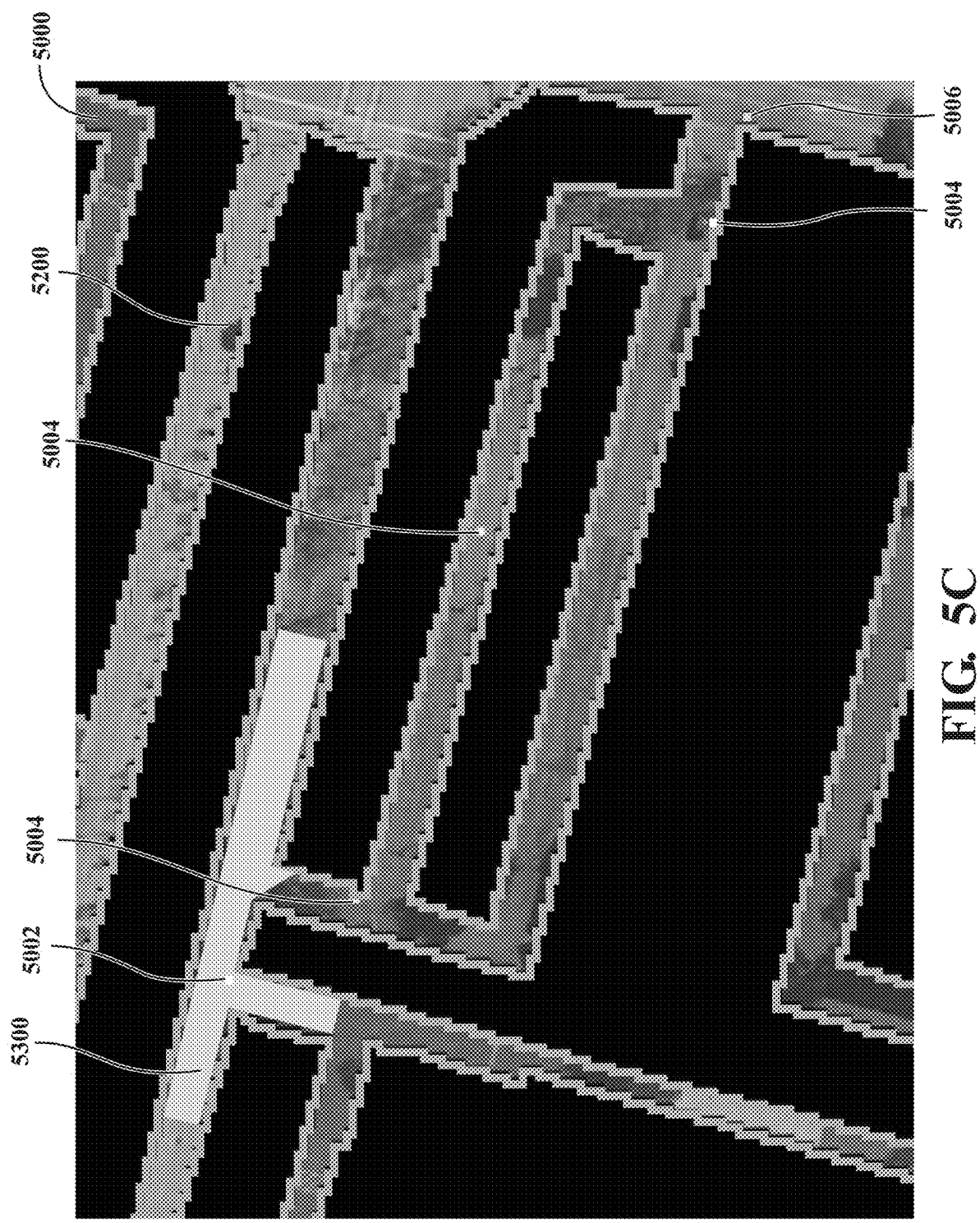

The pathfinding assistance system may receive a drivable area around the vehicle. An example of a drivable area 5300 is shown in FIG. 5C. The drivable area 5300 provides information about the available space around the car at the time of the request. In addition to the static or permanent obstacles around the car, it also considers temporary obstacles. A temporary obstacle may be an obstacle that is present at the time of the request, and is not a static obstacle. For example, a temporary obstacle may be objects such as cars, bikes, cones, pedestrians, etc. Note that the satellite image 5000 is most desirably a static image taken at a point in time before the request is made. Accordingly, temporary obstacles in the satellite image 5000 would not be considered in defining the navigable areas. For example, the image recognition process may be trained to classify such objects as other than static obstacles. Relatedly, temporary obstacles at the time of the request would not be known through the satellite image 5000.

Temporary obstacles may be obtained from sensor data of the vehicle, such as from the sensor 1360 of FIG. 1 or the sensor 2102 of FIG. 2. The sensor data may include image data from an image capture device of the vehicle, object detection information from the vehicle, or both. The sensor data may include sensor data from infrastructure sensor devices at one or more static objects within the geographical area. The sensor data may be used to generate or compute the drivable area 5300 around the vehicle. For example, the sensor data may be used by the vehicle or the assistance request system to compute an occupancy grid around the vehicle. An occupancy grid indicates the presence of objects around the vehicle within sensor ranges. As can be seen from the example of FIG. 5C, the occupancy grid may define the drivable area 5300. The drivable area 5300 may be received as part of the request from the assistance request system. The drivable area 5300 may be received directly from the vehicle. If there are temporary obstacles identified that limit the drivable area 5300, they may be considered as a constraint applied to generate the path.

At operation 3040, the processor generates the path. The path may be generated using any pathfinding algorithm with a plurality of constraints according to the teachings herein. One constraint may be avoiding the temporary obstacles found in the drivable area analysis, the static obstacles, and the buffers 5120. Another constraint may be that the path is generated through each of the multiple points such that the path is located within the navigable areas 5200. Another constraint may be that the path is determined as the shortest distance between the start point 5002 and the end point 5006 (e.g., while passing through each of the stop points 5004). Another constraint may be that the path is generated so as to maximize an amount of the path along the right side of the navigable areas 5200 in the direction of travel. Another constraint may be to avoid impossible turns. That is, every vehicle has certain capabilities dictated by its turning radius, size, etc. The path may be generated so as to avoid turns that are outside of the capabilities of the vehicle. Another constraint may be to avoid any portion of the path from extending outside of the navigable areas 5200.

Figure 5D:
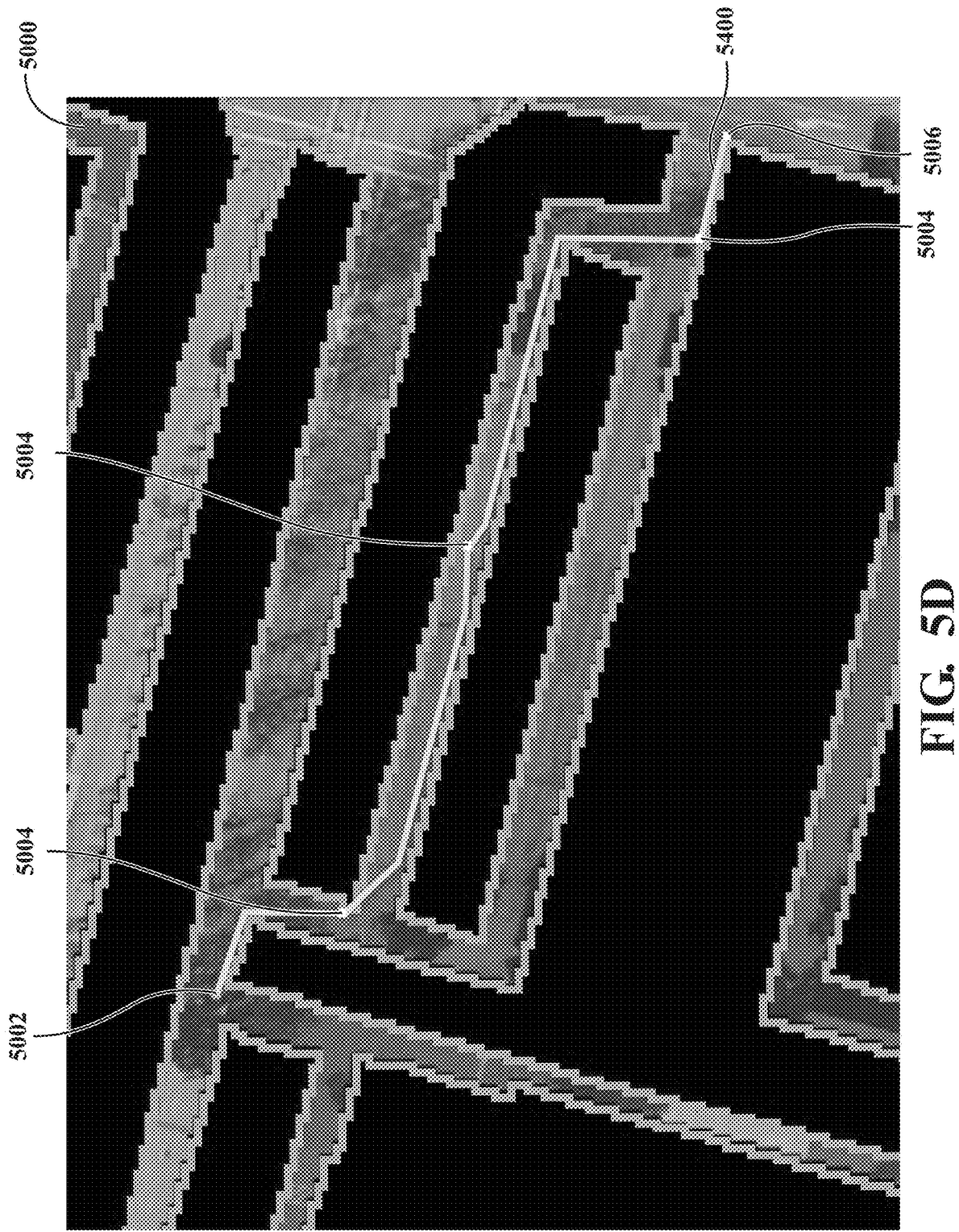
Figure 5E:
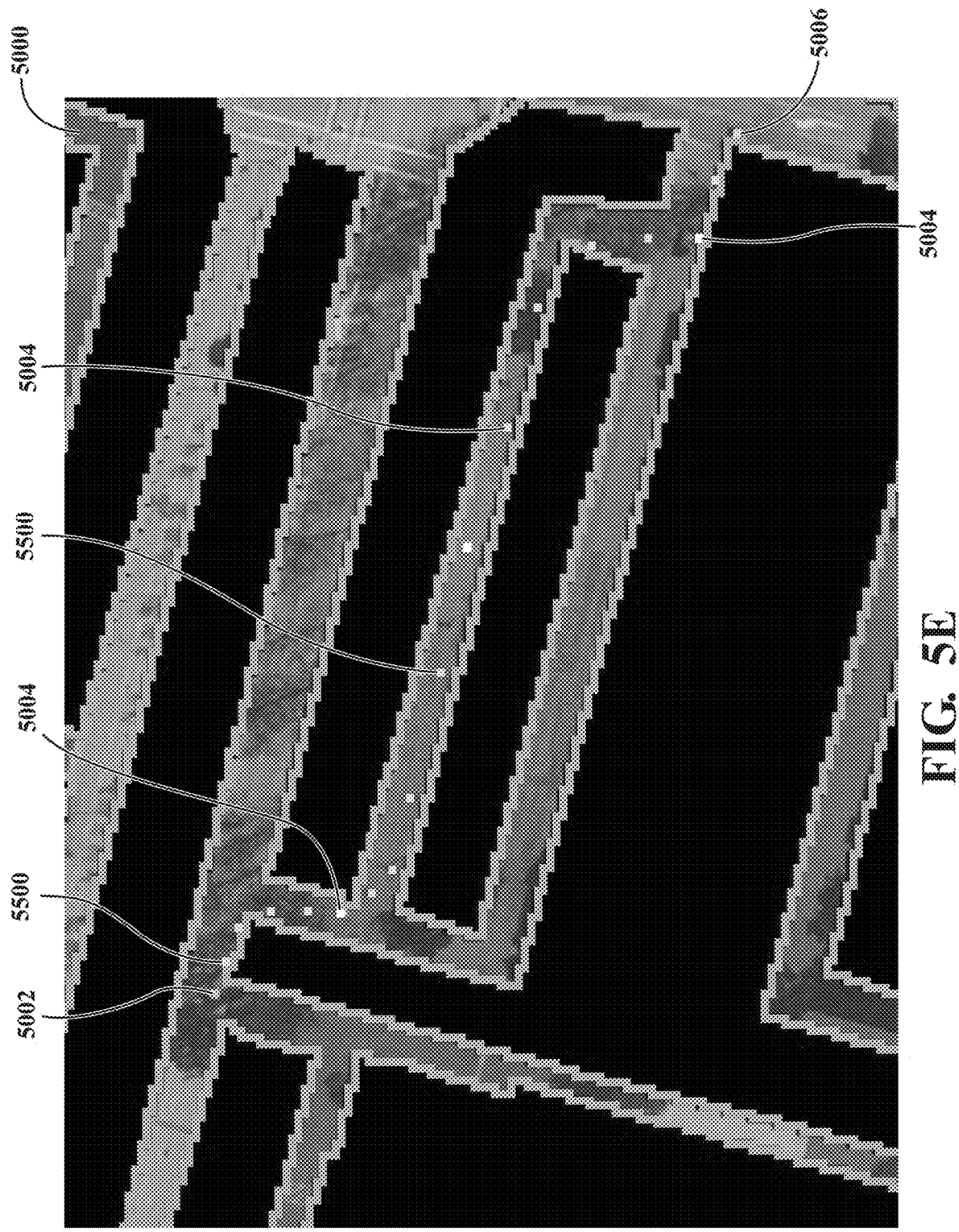

One example of a path 5400 generated using all of the above constraints is shown in FIG. 5D. The path 5400 comprises path segments that extend between adjacent points of the multiple points 5002, 5004, 5006 of the request.

At operation 3050, the processor transmits the path 5400 for use by the vehicle. In the example of FIG. 3, the processor of the pathfinding assistance system transmits the path 5400 at operation 3050 to the assistance request system. The path 5400 may be transmitted along a wired or wireless connection according to any of the communication techniques described with regard to FIG. 2. The path 5400 may be transmitted as representative points 5500. The pathfinding assistance system may identify representative points 5500 as seen by example in FIG. 5E. The multiple points 5002, 5004, 5006 are among the representative points 5500. For example, the representative points 5500 may include more points than only the multiple points 5002, 5004, 5006 such that the multiple points 5002, 5004, 5006 are a proper subset of the representative points 5500. The representative points 5500 may be equidistantly spaced along the path 5400. The representative points 5500 may be equi-temporally spaced based on an expected speed of the vehicle traveling along the path. That is, an expected location at defined time intervals (such as 1 s, 1 ms, 10 s, etc.) along the path 5400 may be identified as the representative points 5500. As can be seen from the example of FIG. 5E, this may result in a spacing where there are more representative points 5500 at turns in the path 5400 than along a relatively straight portion of the path 5400. The representative points 5500 may be equi-temporally spaced between adjacent points of the multiple points 5002, 5004, 5006 in some implementations.

Figure 5F:
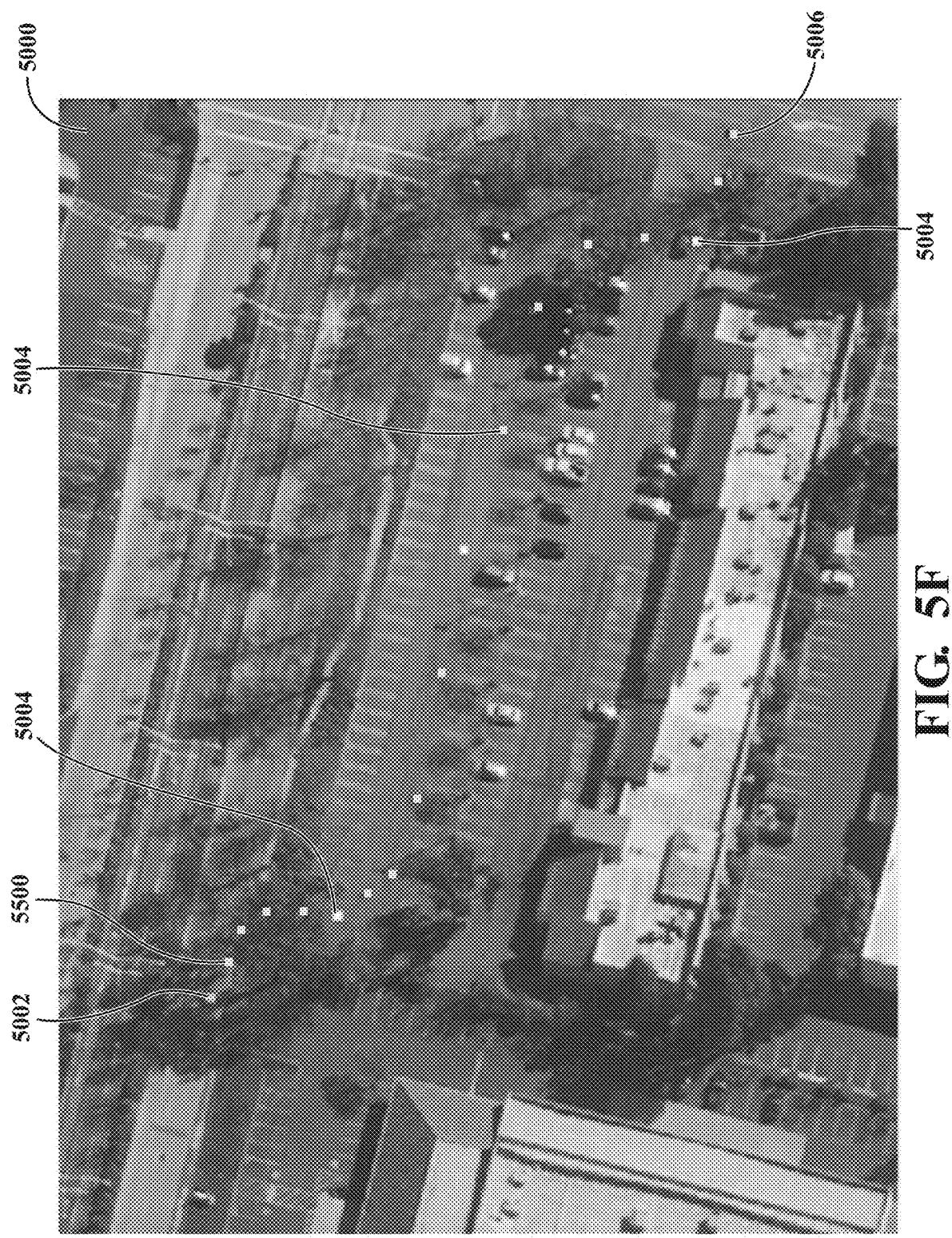

FIG. 5F illustrates the representative points 5500 superimposed over the original satellite image 5000.

The assistance request system receives the path from the processor at operation 3140. The assistance request system may validate the path 5400 at operation 3150. For example, an operator may validate the path 5400 by comparing the path 5400 to sensor data at the assistance request system to confirm that temporary obstacles are outside of the path 5400. The path 5400 does not move in real-time accordingly to the changes around the vehicle once transmitted.

Whether or not the assistance request system validates the path 5400, the assistance request system transmits the path 5400 to the vehicle at operation 3160. The assistance request system may transmit the path 5400 to the vehicle wirelessly. For example, the assistance request system may transmit the path 5400 to the vehicle via one or more wireless communication links, such as the wireless communication links 2310, 2320, or 2370. The vehicle receives the path 5400 at operation 3170, and the vehicle executes the path at operation 3180. The vehicle may execute the path 5400 by generating a display of the representative points 5500 for use by a driver in traversing the path 5400. The vehicle may executed the path 5400 by receiving the path 5400 (e.g., the representative points 5500) in an autonomous control system so as to traverse the path 5400 using the autonomous control system. In some implementations, a new request may be generated with the vehicle reaches the end point 5006.

The disclosed technology provides support for remote operation of a vehicle when the vehicle is traveling a route. The support is particularly useful where the vehicle has a limited view or available maps of navigable areas included unmapped areas. The flow of the vehicle through a particular transportation network is enhanced, which improves the utilization of available transportation resources, and improves passenger experience. Computing the path at the pathfinding assistance system using artificial-intelligence with a satellite image and sensor data reduces the amount of time an assistance request system needs to address assistance request signals that include a need for a path, and quickly generates a path that is easily checkable.

As used herein, the terminology "driver" or "passenger" may be used interchangeably. As used herein, the terminology "processor" or "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for remote support of autonomous operation of a vehicle, the apparatus comprising:
    a processor that performs a method comprising:
        receiving a query to define a path for the vehicle while the vehicle is traveling along a route from an origin to a destination in a vehicle transportation network, the query comprising multiple points including at least a start point and an end point of the path;
        obtaining a satellite image of a portion of a geographical area that encompasses the multiple points;
        determining, using the satellite image, static obstacles within the portion of the geographical area, the static obstacles defining navigable areas within the vehicle transportation network;
        generating the path through each of the multiple points such that the path is located within at least one navigable area of the navigable areas, wherein generating the path comprises generating the path through each of the multiple points within the navigable areas using a plurality of constraints, the plurality of constraints including at least one of:
            maximizing an amount of the path along a right side of the navigable areas in a direction of travel; or
            avoiding a temporary obstacle sensed within a drivable area of the vehicle, wherein the temporary obstacle is not located within the satellite image; and
        transmitting the path for use by the vehicle.

2. The apparatus of claim 1, further comprising:
    an assistance request system receiving an assistance request signal from the vehicle, the assistance request signal identifying a need for assistance by the vehicle while traveling the route, wherein the assistance request system:
transmits, responsive to receiving the assistance request signal, the query for receipt by the processor;
receives the path from the processor; and
transmits the path to the vehicle.

3. The apparatus of claim 1, wherein the plurality of constraints include:
determining a shortest distance for the path between the start point and the end point;
avoiding turns in the path that are outside of the capabilities of the vehicle; and
avoiding any portion of the path from extending outside of the navigable areas.

4. The apparatus of claim 1, wherein the multiple points comprise at least one stop point for the path between the start point and the end point, the at least one stop point comprising a location through which the path is to pass, and wherein each of the multiple points is identified by a latitude and a longitude.

5. The apparatus of claim 1, wherein the query comprises:
a location and an orientation of the vehicle at a time of the query; and
the drivable area around the vehicle at the time of the query, wherein the drivable area is generated at the vehicle using sensor data.

6. The apparatus of claim 5, wherein the drivable area around the vehicle comprises an occupancy grid around the vehicle that is computed using sensor data of the vehicle, the occupancy grid indicates a presence of at least one object around the vehicle within sensor ranges, and the at least one object includes the temporary obstacle.

7. The apparatus of claim 1, wherein the method comprises:
identifying representative points along the path, wherein the multiple points are a proper subset of the representative points, and wherein transmitting the path comprises transmitting the representative points.

8. The apparatus of claim 7, wherein the representative points are equi-temporally spaced based on an expected speed of the vehicle traveling along the path.

9. The apparatus of claim 1, wherein the method comprises:
defining the navigable areas by:
defining a grid overlaying the satellite image; and
identifying squares of the grid that are associated with the static obstacles, wherein boundaries of the static obstacles lie along outer edges of at least some of the squares, and the navigable areas are between the boundaries.

10. The apparatus of claim 9, wherein defining the navigable areas further comprises extending the boundaries of the static obstacles a defined distance from the outer edges of the at least some squares of the grid.

11. The apparatus of claim 1, further comprising:
memory storing instructions for performing the method, wherein the processor is configured to execute the instructions to perform the method.

12. An apparatus for remote support of autonomous operation of a vehicle, the apparatus comprising:
a processor; and
an assistance request system receiving an assistance request signal from the vehicle, the assistance request signal identifying a need for assistance by the vehicle while traveling along a route from an origin to a destination in a vehicle transportation network, wherein the assistance request system transmits to the processor, responsive to receiving the assistance request signal, a query to define a path for the vehicle, and wherein the processor performs a method comprising:
receiving the query, the query comprising multiple points including at least a start point and an end point of the path;
obtaining a satellite image of a portion of a geographical area that encompasses the multiple points, wherein the satellite image is a static image taken at a point in time before the request is made;
receiving a drivable area around the vehicle at the time of the query, the drivable area identifying at least one temporary obstacle sensed by the vehicle and not present in the satellite image;
determining, using the satellite image, static obstacles within the portion of the geographical area, wherein navigable areas within the vehicle transportation network are located between the static obstacles;
generating the path through each of the multiple points, such that the path is located within at least one navigable area of the navigable areas, wherein generating the path comprises applying the temporary obstacle as a constraint, wherein generating the path comprises maximizing an amount of travel along a right side of the navigable areas in a direction of travel; and
transmitting the path to the assistance request system, wherein the assistance request system transmits the path to the vehicle.

13. The apparatus of claim 12, wherein the assistance request system validates the path before transmitting the path to the vehicle.

14. The apparatus of claim 12, wherein the assistance request system generates the multiple points, the multiple points comprising at least one stop point for the path between the start point and the end point, the at least one stop point comprising a location through which the path is to pass, wherein each of the multiple points is identified by a latitude and a longitude, and wherein the query comprises:
the latitude and the longitude for each of the multiple points; and
a location and an orientation of the vehicle at a time of the query.

15. The apparatus of claim 12, wherein generating the path comprises generating the path at a defined point in time, and wherein the path is unchanged in real time according to changes around the vehicle.

16. A method for providing remote support of autonomous operation of a vehicle, the method comprising:
receiving a query to define a path for the vehicle while the vehicle is traveling along a route from an origin to a destination in a vehicle transportation network, the query comprising multiple points including at least a start point and an end point of the path;
obtaining a satellite image of a portion of a geographical area that encompasses the multiple points, wherein the satellite image is a static image taken at a point in time before the request is made;
determining, using the satellite image, static obstacles within the portion of the geographical area, wherein the multiple points are located within at least one navigable area of navigable areas of the vehicle transportation network, and the navigable areas comprise areas between the static obstacles;
generating the path through each of the multiple points, wherein generating the path comprises generating the path such that the path comprises:

a path that maximizes an amount of travel along a right side of the navigable areas in a direction of travel;

a path that avoids turns that are outside of capabilities of the vehicle; and a path that avoids traveling outside of the navigable areas; and transmitting the path for use by the vehicle.

17. The method of claim 16, wherein receiving the query comprises receiving the query from an assistance request system, and transmitting the path comprises transmitting the path to the assistance request system for transmission to the vehicle.

18. The method of claim 16, wherein generating the path comprises generating the path such that the path comprises:

a shortest path between the start point and the end point that contacts each of the multiple points, the multiple points including at least one stop point for the path between the start point and the end point.

19. The method of claim 16, wherein receiving the query comprises:

receiving each of the multiple points as a latitude and a longitude;

receiving a location and an orientation of the vehicle at a time of the query; and receiving a drivable area around the vehicle at the time of the query, wherein the drivable area comprises sensed data determined from sensors near or at the vehicle.

20. The method of claim 16, further comprising:

defining a grid overlaying the satellite image, wherein boundaries of the static obstacles lie along outer edges of at least some squares of the grid;

extending the boundaries of the static obstacles a defined distance from the outer edges of the at least some squares of the grid to define the navigable areas; and identifying representative points along the path, wherein the multiple points are a proper subset of the representative points and are unevenly spaced along the path, wherein transmitting the path comprises transmitting the representative points.

\* \* \* \* \*